United States Patent [19]

Cookingham

[11] Patent Number: 5,458,082
[45] Date of Patent: Oct. 17, 1995

[54] TIP TO TAIL ILLUMINATED POINTER

[75] Inventor: Gerald T. Cookingham, Flushing, Mich.

[73] Assignee: Delco Electronics Corp., Kokomo, Ind.

[21] Appl. No.: 216,871

[22] Filed: Mar. 24, 1994

[51] Int. Cl.⁶ ................................................. G01D 11/28
[52] U.S. Cl. .............................. 116/288; 362/23; 362/26; 362/27
[58] Field of Search ..................... 116/284, 286, 116/287, 288, 303, 305, 327, 328, 332; 362/23, 26, 27, 28, 29, 30, 31; 340/815.42

[56] References Cited

U.S. PATENT DOCUMENTS

| | | | |
|---|---|---|---|
| 4,559,582 | 12/1985 | Scardilli et al. | 362/30 |
| 4,860,170 | 8/1989 | Sakakibara et al. | 362/26 |
| 5,199,376 | 4/1993 | Pasco | 116/288 |
| 5,372,087 | 12/1994 | Kato et al. | 116/288 |

FOREIGN PATENT DOCUMENTS 3347014  7/1985  Germany ................................ 116/288

*Primary Examiner*—William A. Cuchlinski, Jr.
*Assistant Examiner*—A. Hirshfeld
*Attorney, Agent, or Firm*—Jimmy L. Funke

[57] ABSTRACT

An instrument pointer assembly driven by a spindle and illuminated by a light source adjacent the spindle includes a pointer and a central cap covering the spindle region of the assembly. The pointer conducts light from the source toward its tip for illumination. A window in the cap aligned with the pointer is covered by a filter colored to resemble the pointer. The window overlaps the pointer and extends sufficiently in the direction away from the tip to provide a pointer tail contiguous with and illuminated the same as the pointer.

8 Claims, 1 Drawing Sheet

TIP TO TAIL ILLUMINATED POINTER

FIELD OF THE INVENTION

This invention relates to illuminated instrument displays and particularly to instrument pointers which extend in both directions from an axis of rotation and are illuminated throughout their whole length.

BACKGROUND OF THE INVENTION

Instrument gauges used for displaying information in motor vehicles generally employ pointers which are illuminated at least at night for easy viewing. While pointer styles vary for aesthetic reasons as well as for functional viewing reasons to suit different situations, pointers usually have been illuminated from the tip to some point short of the spindle axis. It is desirable in some applications to have a longer illuminated portion of the pointer and especially including a tail portion which extends beyond the spindle axis opposite from the pointer tip.

Such tip to tail illuminated pointers have been achieved using an expensive construction and yet have resulted in nonuniform illumination along the length of the pointer.

SUMMARY OF THE INVENTION

It is therefore an object of the invention to uniformly illuminate an instrument pointer extending across the axis of rotation of the pointer. Another object is to provide such uniform illumination with a simple structure.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 2:
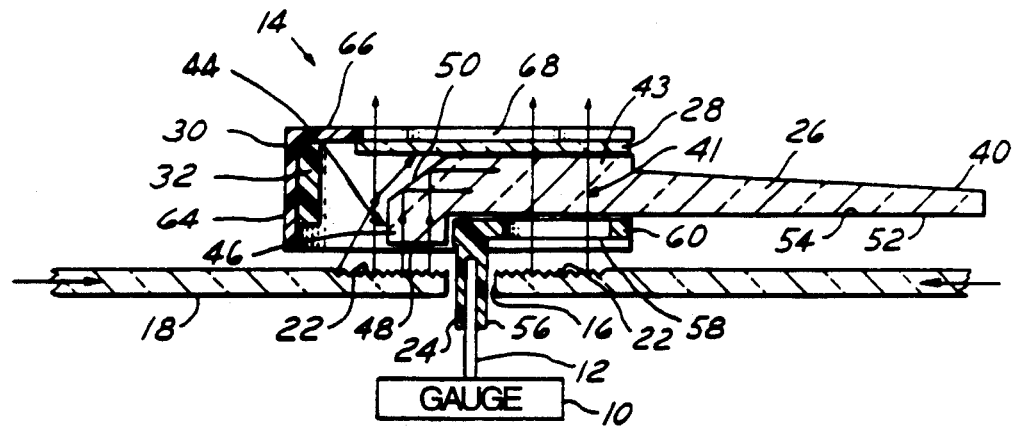
FIG. 2 is a cross-sectional view of the pointer assembly taken along line 2—2 of FIG. 1.
Figure 1:
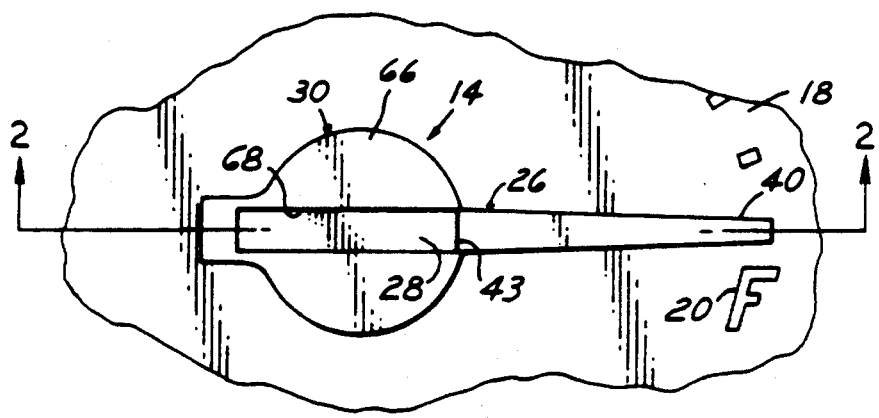
FIG. 1 is a front view of a display including an instrument pointer assembly, according to the invention.

An analog display instrument for a motor vehicle is shown in FIGS. 1 and 2. A driving motor such as an air core gauge 10 at the rear of the display has a spindle 12 coupled to a pointer assembly 14 at the front of the display. The spindle 12 and/or a stem of the pointer assembly extends through an aperture 16 in an illuminated face plate 18, which carries display indicia 20 on its front face. The face plate 18 comprises a translucent light conducting material or light pipe edge lighted by lamps, not shown. Light, shown by arrows, travels from the lamps through the face plate and is generally contained within the face plate by internal reflection, as is well known. A pointer assembly light source 22 surrounding the aperture 16 comprises small facets in the front surface of the face plate 18 for coupling light from the face plate and directing it to the pointer assembly 14.

Figure 3:
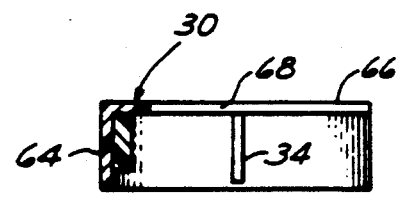
FIG. 3 is a cross-section of the cap of the assembly of FIG. 1.

The pointer assembly 14 includes a stem 24 for attachment to the spindle 12, a pointer 26 mounted in front of the stem, a filter 28 mounted in front of the pointer, a cap 30 in front of the filter 28, and a counterweight 32 carried within the cap to balance the weight of the pointer 26. As shown in FIG. 3, the cap 30 has a pair of depending internal posts 34 which extend through mating holes 36 in the pointer 26, the filter 28 and the stem 24 and are staked to form an integral assembly carried by the spindle 12 and rotatable about the spindle axis. Except for the filter 28, this type of assembly is already known in commercial use, the invention being accomplished merely by the addition of the filter and modification of the other elements of the pointer assembly, so that the advantages of a uniformly lighted elongated pointer display is obtained by a simple structure and at minimal added expense.

Figure 4:
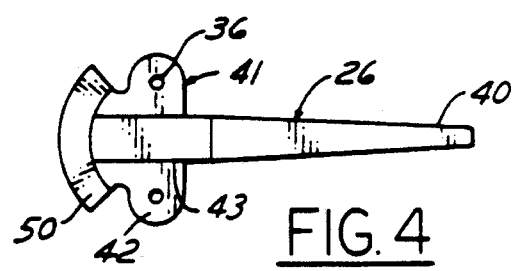
FIG. 4 is a front view of the pointer of the assembly of FIG. 1.

The pointer 26, best shown in FIGS. 2 and 4, is made of a light conducting material such as a clear polycarbonate, and has an elongated tapered body terminating in a tip 40, a hub portion 41 centered about the spindle axis including a pair of lateral wings 42 containing the attachment holes 36, and a ledge 43 adjacent the filter 28 which is not tapered and forms a firm support for the filter. A light gathering feature 44 includes an arcuate projection 46 adjacent the spindle 12 and extending axially toward the face plate. A collecting surface 48 opposed to the light source 22 in the face plate 18 receives light from the source, and an angled reflective surface 50 in front of the collecting surface directs the light along the pointer 26 toward the tip 40. The pointer tapers down toward the tip, the front surface being angled except at the ledge 43, so that at each increment along its length beyond the ledge a portion of the light traveling along the pointer is directed to the pointer rear surface 52. An applique or coating 54 of pigment on the rear surface 52 reflects the light forward. As is already known, the coating generally comprises a translucent white film where a white pointer illumination is desired, and incident ambient light as well as light from the source is reflected from the film 54 to enhance the pointer visibility, even when the light source is not energized as may be the case during daylight viewing. Where a colored pointer is desired the coating comprises two layers or films, a non-white colored pigment being applied directly to the rear surface and the white film being applied over the non-white colored one.

Figure 5:
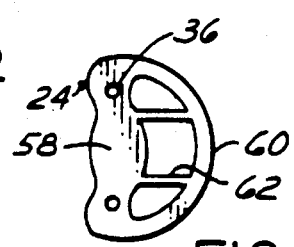
FIG. 5 is a front view of the stem of the assembly of FIG. 1.

The stem 24, shown in FIGS. 2 and 5, includes a tubular mount 56 for mating with the spindle 12, and a base 58 engaging the rear surface 52 of the pointer 26 to support the pointer and the rest of the assembly 14. The base extends laterally of the pointer to include the holes 36 and has an arcuate element 60 protruding toward the pointer tip 40 and reinforced by webs 62. The webs 62 and the arcuate element 60 define apertures to facilitate the passage of light from the light source 22 to the pointer 26 and the filter 28.

The cap 30 includes side walls 64 and a front wall 66 which generally surround the light source 22 and mask extraneous light from escape. The cap is preferably painted black on its outer surface and/or is molded of opaque material. The cap is preferably molded of white material or else the internal surfaces of the walls are painted white to maximize the light reflection within the cap. A rectangular window 68 in the front wall 66 aligned with the pointer 26 and covered below by the filter 28 permits a controlled light emission to form a pointer tail portion contiguous with the pointer body. The window 68 is preferably of the same width as the pointer where it joins the cap 30 to provide apparent continuity with the pointer. By extending the window well beyond the spindle axis in the direction opposite the pointer tip, the pointer and the tail portion are directly and simultaneously visible to present a very long total tip-to-tail indicator.

Figure 6:
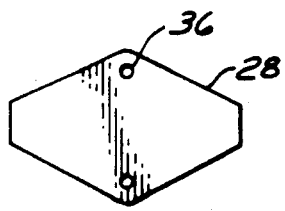
FIG. 6 is a front view of the filter of the assembly of FIG. 1.

The filter 28 (FIG. 6) is molded of polycarbonate or other translucent material, or punched from sheet polycarbonate or other translucent material. It overlaps the pointer in the region of the spindle axis, being supported by the ledge 43 but extends beyond the pointer away from the tip to define the tail, along with the window 68. By decorating and illuminating the filter 28 to resemble the pointer, the tail portion appears to be contiguous with the pointer to form a continuous line of light of uniform intensity from tip to tail. Light is transmitted directly from the source to the filter 28 around the edges of the pointer, particularly adjacent to the pointer projection 46, and indirectly by reflection from the white inner walls of the cap to illuminate the tail end on the filter. In addition, light from the source 22 is transmitted through the apertures in the stem 24 and through the body of the pointer 26 to the filter 28 to illuminate the other (pointer) end of the filter.

To achieve the appropriate appearance of the tail, the filter is coated on its rear surface in the same manner as the pointer with films of white pigment and optional colored pigment. The intensity of the tail illumination due to the light source is adjusted by controlling the white coating opacity to match the intensity of the pointer. This also achieves daylight illumination of the filter due to reflection of ambient light in the same manner as for the pointer, so that uniform lighting of the indicator from tip to tail is apparent for ambient lighting as well as for lighting from the source.

It will thus be recognized that forming a window in the pointer cap and adding a filter over the window, a tail portion contiguous with a pointer is simply and inexpensively made, and that by selecting the filter characteristics the tail portion is readily made to be of the same light intensity as the pointer, providing uniform appearance from tip to tail, whether illuminated by ambient light or by the light source.

The embodiments of the invention in which an exclusive property or privilege is claimed are defined as follows:

1. In an illuminated instrument display having a spindle for driving a pointer assembly about an axis, and a light source adjacent the spindle; the pointer assembly comprising:

a translucent pointer extending from the axis to a tip and arranged for illumination by the light source;

a translucent filter overlapping the pointer and extending beyond the axis away from the tip and arranged for illumination by the light source;

a cap mounted over the pointer and filter and covering the light source;

the cap defining an elongated window over the filter, the window being aligned with the pointer to define a pointer tail, wherein when the light source is energized the pointer and tail are each directly and simultaneously visible to present an apparent continuous line of light extending across the axis from the tip to the tail.

2. The display as defined in claim 1 wherein the light source is behind the pointer assembly and includes means for emitting light forwardly to illuminate the pointer and the filter.

3. The display as defined in claim 2 wherein the pointer includes a light gathering surface facing the light source and means for internally reflecting gathered light throughout the pointer.

4. The display as defined in claim 2 wherein the cap has reflecting internal walls exposed to the light source, and light from the source reaches the filter by direct transmission and by reflection from the walls of the cap.

5. The display as defined in claim 2 wherein light from the source reaches the filter in part by transmission through the pointer transverse to the length of the pointer.

6. The display as defined in claim 1 wherein the filter and the pointer each have a rear surface facing the light source and the rear surfaces are coated with a film of translucent white pigment for reflecting incident ambient light to enhance pointer visibility and to allow passage of light from the light source through the filter and the pointer.

7. The display as defined in claim 6 wherein the filter and the pointer further have a film of colored pigment on the rear surface beneath the film of white pigment for coloring the continuous line of light.

8. The display as defined in claim 1 including a stem coupled to the spindle and to the translucent pointer for driving the pointer assembly about the axis, the stem including:

support means engaging a rear surface of the pointer; and apertures in the stem for passing light from the source to the rear surface of the pointer for transmission forwardly to the filter.

\* \* \* \* \*